(12) United States Patent
Staker et al.

(10) Patent No.: US 7,508,572 B2
(45) Date of Patent: Mar. 24, 2009

(54) CHARGING GUARD WITH PASCHEN STACKING

(75) Inventors: Bryan P. Staker, Pleasanton, CA (US); Andres Fernandez, San Francisco, CA (US); Windsor Owens, San Francisco, CA (US); Alexander P. Kindwall, San Francisco, CA (US)

(73) Assignee: Glimmerglass Networks, Inc., Hayward, CA (US)

(*) Notice: Subject to any disclaimer, the term of this patent is extended or adjusted under 35 U.S.C. 154(b) by 11 days.

(21) Appl. No.: 11/559,825

(22) Filed: Nov. 14, 2006

(65) Prior Publication Data

US 2008/0112038 A1    May 15, 2008

(51) Int. Cl.
*G02B 26/00* (2006.01)
*G02B 26/08* (2006.01)
*G02F 1/29* (2006.01)

(52) U.S. Cl. .................... 359/295; 359/291; 359/298
(58) Field of Classification Search ................ 359/290, 359/292, 295, 298, 291
See application file for complete search history.

(56) References Cited

U.S. PATENT DOCUMENTS 5,991,079 A * 11/1999 Furlani et al. ............... 359/573
6,389,189 B1    5/2002 Edwards et al.
6,472,290 B2 * 10/2002 Cho et al. .................... 438/411
6,661,069 B1 * 12/2003 Chinthakindi et al. ....... 257/415
6,825,967 B1    11/2004 Chong et al.
2004/0087092 A1 * 5/2004 Huang et al. ................ 438/296

OTHER PUBLICATIONS

International Search Report PCT/US07/84568.

* cited by examiner

*Primary Examiner*—Ricky L Mack
*Assistant Examiner*—Brandi N Thomas
(74) *Attorney, Agent, or Firm*—Townsend and Townsend and Crew LLP; Kenneth R. Allen

(57) ABSTRACT

A MEMS-based mirror is provided with trenches between adjacent electrodes in order to be able to withstand relatively high applied voltages, and thus has a substantially reduced exposure to uncontrolled surface potentials. The MEMS-based mirror, thus avoids voltage drifts and has an improved mirror position stability. The trench dimensions are selected such that the voltage applied between each adjacent pair of electrodes stays within predefined limits. An insulating layer, such as silicon dioxide, electrically isolates each pair of adjacent electrodes. Each insulting layer extends partially above an associated trench and is characterized by the same height and width dimensions.

12 Claims, 4 Drawing Sheets

CHARGING GUARD WITH PASCHEN STACKING

BACKGROUND OF THE INVENTION

The present invention relates to micro-electro mechanical system (MEMS) devices, and more particularly, to MEMS mirrors adapted to operate safely under high applied voltages.

A MEMS device is typically formed, in part, using well known integrated circuit (IC) fabrication processes. One such device is a gimbaled mirror adapted to pivot in response to electrostatic actuation. The mirror's motion is used to redirect light beams. Electrostatic actuation is often achieved via capacitive action between electrodes formed on a planar surface of a substrate and the mirror positioned above the electrode. To obtain a relatively large range of angular motion, the mirror is suspended at a relatively large distance above the electrodes. Accordingly, a relatively large voltage is often necessary to cause the actuation.

In practice, the maximum voltage that can be applied is limited by the well understood voltage breakdown effects. For example, if two flat electrodes are separated by a uniform gap, the voltage at which the ambient gas breaks down is described by the well known Paschen's curve, which is shown in FIG. 1. As seen from FIG. 1, the exact curve depends on the type of ambient gas, but the general shapes are similar. Breakdown is characterized by an uncontrolled discharge of electrical energy, which can cause severe physical damage to any surfaces exposed to the discharge.

In addition to breakdown of the ambient gas, breakdown can also occur along surfaces. If two conductors are separated by an insulator, breakdown can occur along the surface of the insulator. Unlike Paschen breakdown, surface breakdown is not a simple function of separation, but is a more complex function of the linear path length of the insulator and is strongly influenced by surface contaminants.

Whether breakdown occurs through the gas or on the surface, safe operation of MEMS devices using electrostatic actuation must occur below voltages that would result in breakdown. This constraint places practical limits on the design of electrostatic MEMS devices such as the MEMS mirror mentioned above.

Another common problem encountered in electrostatic MEMS devices is control of the surface potentials between the electrodes and various insulating surface layers. Surface potentials on dielectric surfaces are prone to drift over time due to charge migration along dielectric surfaces between the electrodes. This can cause serious problems regarding repeatability of the mirror positioning.

The conduction characteristics of these surfaces are inherently unstable due to sensitivity to temperature, moisture and other environmental factors. They can also be affected by electromagnetic radiation (light), which can be time dependent, depending on the application, contributing to system crosstalk. The conductivity of these surfaces is also strongly affected by impurities and process steps and materials used in the deposition and etching of the surfaces. All of these factors combined contribute to a loss of control of the surface potentials that contribute to the forces and torques applied to the actuable elements resulting in an unreliable and uncontrollable device.

BRIEF SUMMARY OF THE INVENTION

A MEMS-based mirror, is adapted to withstand relatively high applied voltages and has a substantially reduced exposure to uncontrolled surface potentials by the provision of trenches between adjacent electrodes of the MEMS-based mirror. The MEMS-based mirror, accordingly, avoids voltage drifts and has an improved mirror position stability. The trench dimensions are selected such that the voltage applied between each adjacent pair of electrodes stays within predefined limits, as determined, for example, by the Paschen curve.

In one embodiment, the electrodes (conductive elements) are formed in a silicon substrate. An insulating layer, such as silicon dioxide is used to electrically isolate the electrodes from one another and from the rest of the substrate. Each insulting layer extends partially above an associated trench. In some embodiments, the height of the extension is 2 to 4 times the width of the extensions. The insulating layer extensions that protrude from a bottom surface of their associated trenches provide a greater path length along the insulator surfaces that separate the electrodes from each other and from the rest of the substrate. A greater path length mitigates surface breakdown effects and thus, in conjunction with the trench discussed above, allows for relatively large voltages to be applied to the electrodes.

To reduce exposure to uncontrolled surface potentials, the top surface of the insulating layer is substantially recessed from the top surface of the electrodes. Any charges that accumulate on the insulator will be shielded by the conductive sidewalls of the trench thereby reducing the device susceptibility to surface potential drift on the insulators.

To further increase the range of voltages that may be applied to the MEMS-based mirror of the present invention, a multitude of trenches is disposed between the electrodes receiving these voltages. Each trench is characterized by the same depth and the same width. The trench heights may be different from the trench widths. The insulating layer electrically isolating each electrode extends upwardly from the bottom surface of each trench and it is substantially recessed from the top surface of the electrodes. The multitude of trenches electrically isolating each electrode allows one to cascade the applied voltage to an arbitrarily high value depending on the number of such trenches.

DETAILED DESCRIPTION OF THE INVENTION

Figure 2:
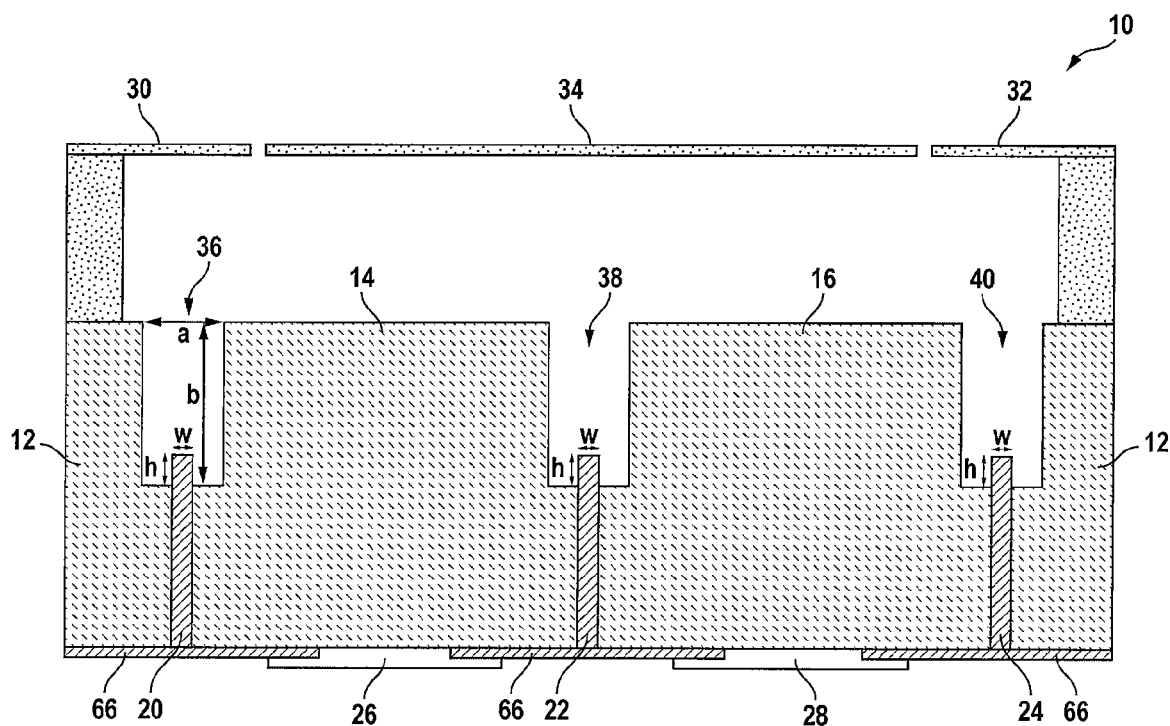
FIG. 2 is a cross-sectional view of a MEMS-based mirror, in accordance with one embodiment of the present invention.

FIG. 2 is a cross-sectional view of a MEMS-based mirror 10, in accordance with one embodiment of the present invention. As described below, MEMS-based mirror 10 is adapted to withstand relatively high applied voltages, and has a substantially reduced exposure to uncontrolled surface potentials, thereby avoiding voltage drifts and mirror position instability.

As seen from FIG. 2, electrodes 14 and 16 are electrically isolated from the rest of the substrate via insulators 20 and 24 and electrically isolated from one another via insulator 22. In the exemplary embodiment 10 of the MEMS-based mirror, the electrodes as well as supporting structures 30, 32 that support mirror 34 are formed using silicon and thus have matching thermal expansion coefficient to the electrodes and base material. In such embodiments, insulating layers 20, 22 and 24 may be formed using silicon dioxide. Metal pads 26 and 28 are used to apply voltages to electrodes 14 and 16. Although not shown, it is understood that similar metal pads are also formed and used to apply voltages to the base substrate 12.

MEMS-based mirror 10 is characterized, in part, by the trenches disposed between the electrodes as well as the trenches disposed between the electrodes and the substrate. Shown in FIG. 2 is trench 36 disposed between substrate 12 and electrode 14; trench 38 disposed between electrodes 14 and 16; and trench 40 disposed between electrodes 16 and substrate 12. Insulating layers 20, 22 and 24 are formed so as to extend from the bottom surface of trenches 36, 38 and 40 respectively. The heights and widths of oxide extensions, respectively shown as H and W, are selected so as to increase the total path length along the insulator surfaces that separate the electrodes from each other and from the rest of the substrate. Furthermore, the width A, of each of the trenches, and dimensions H and W are selected to maximize the voltage that can be applied between each adjacent electrode pairs, as discussed further below.

Figure 1:
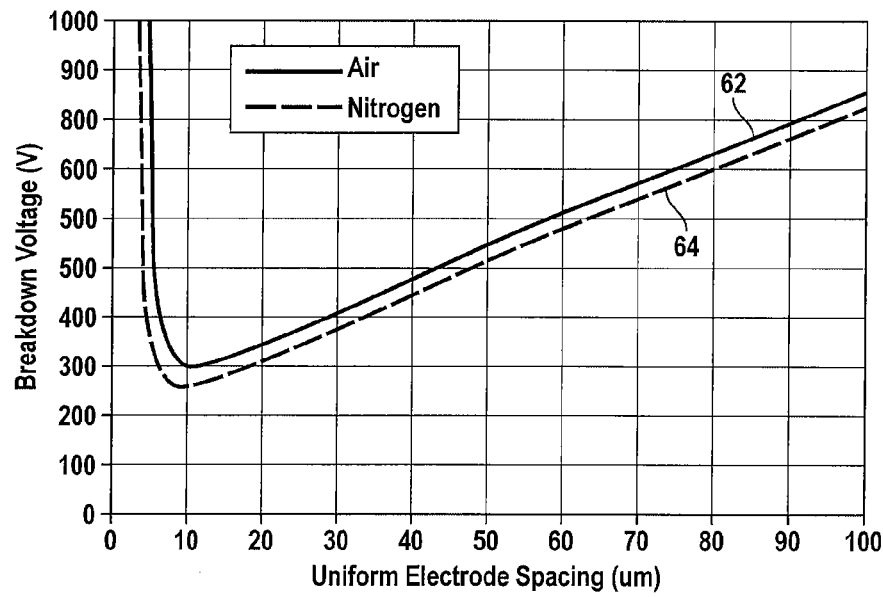
FIG. 1 shows the breakdown voltage as a function of the trench gap, as known in the prior art.

FIG. 1 shows the breakdown voltage as a function of the trench width A, commonly referred to as Paschen curve, for both air 62 and nitrogen 64. For example, when trench width A is approximately 80-90 μm, the breakdown voltage is approximately 800 volts. To provide additional operating margins, in some embodiments, a maximum voltage of, for example, 400 volts is applied between each adjacent electrode pairs when a trench width of 80 μm is selected. Another reason to add additional margin is that the curve in FIG. 1 assumes that the electrodes are infinite in extent. Real electrodes are finite in size, and the fringe fields caused by sharp edges could significantly increase the local electric fields compared to the case for infinite electrodes. Such field enhancements could reduce the actual value of breakdown voltage compared to the Paschen curve. A safe rule of thumb is to operate with a factor of two safety margin from the breakdown voltage predicted by Paschen. It is understood that safety margin factors other than two may be used.

Another type of breakdown process that can occur is surface breakdown. In this case, breakdown occurs along the surface of an insulator and is a more complex function of the separation between the conductors than that displayed in FIG. 1. In general, the breakdown voltage increases as the total path length along the surface of an insulator separating two conductors is increased. Accordingly, in some embodiments, the insulator is extended to a height H above the bottom of the trench to increase the total path length along the insulator between, for example, electrodes 14 and 12. In one embodiment, the height and width of oxide extensions, respectively shown as H and W, are selected to have respective values of, for example, 20 μm and 10 μm. An insulating layer 66 on the back of the substrate prevents breakdown from occurring on the backside.

FIG. 2 shows that the top surface of the insulators 20, 22, and 24 are disposed substantially below the surface of electrodes 14, 16, and substrate 12. By recessing the insulators below these surfaces, charges that accumulate over time on the insulators are effectively shielded by the conductive sidewalls of the trench thereby reducing the susceptibility of the device to such charging processes. In general, the greater the aspect ratio (B-H)/A is, the less sensitive the MEMS device will be to charging on the insulators. In some embodiments, the ratio of insulator depth to trench width, namely (B-H)/A may be two. For example, to sustain the application of 400 V between each adjacent pair of electrodes, e.g., electrodes 14 and 16, or between the substrate and an adjacent electrode, e.g., substrate 12 and electrode 14, in one embodiment, insulator depth (B-H) is selected to be 160 μm, and trench width A is selected to be 80 μm. If the insulator height is, e.g., 20 μm, then the trench depth is, e.g., 180 μm.

Figure 3:
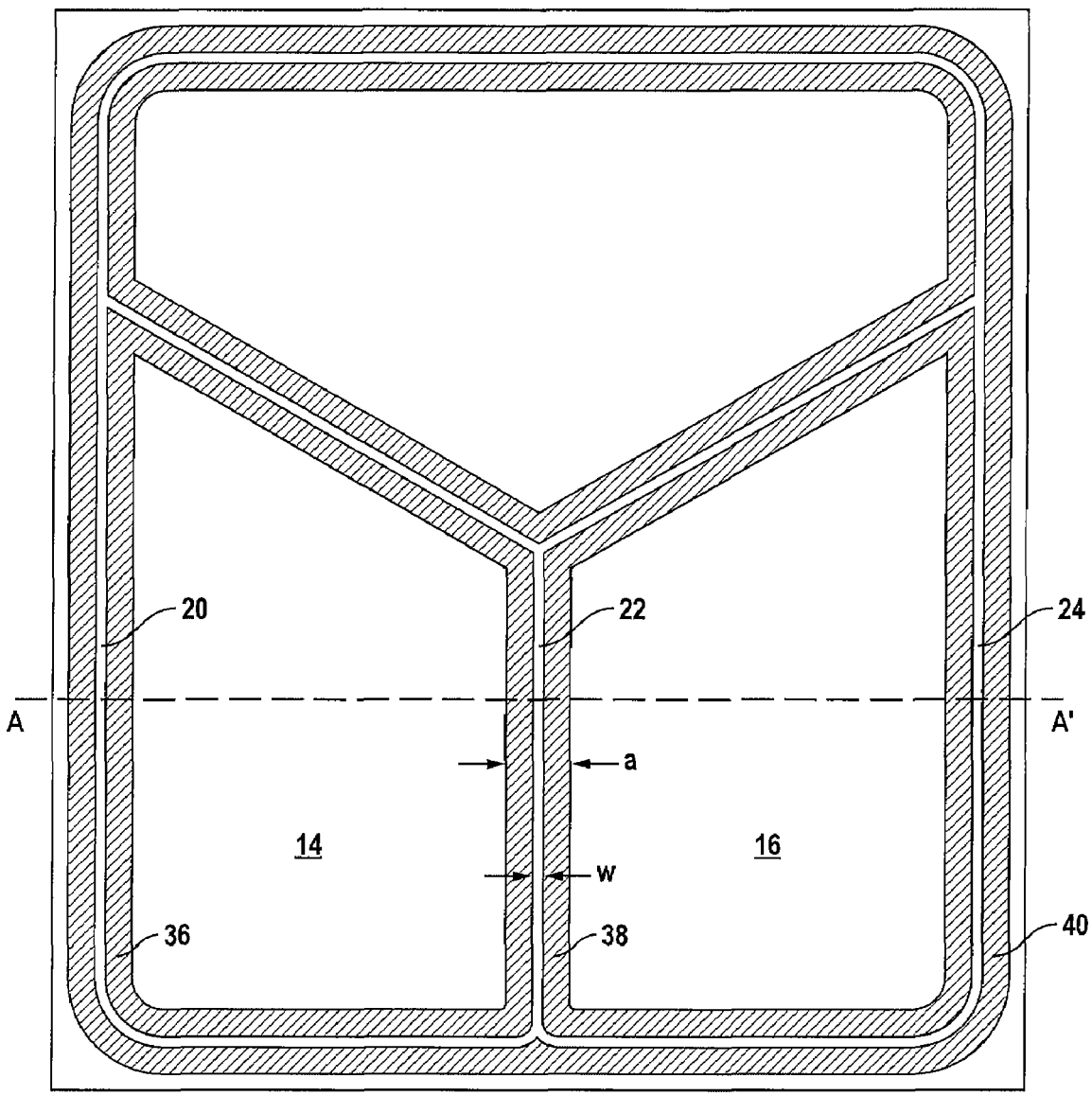
FIG. 3 is a top view of the MEMS-based mirror shown in FIG. 2, in accordance with one embodiment of the present invention.
Figure 4:
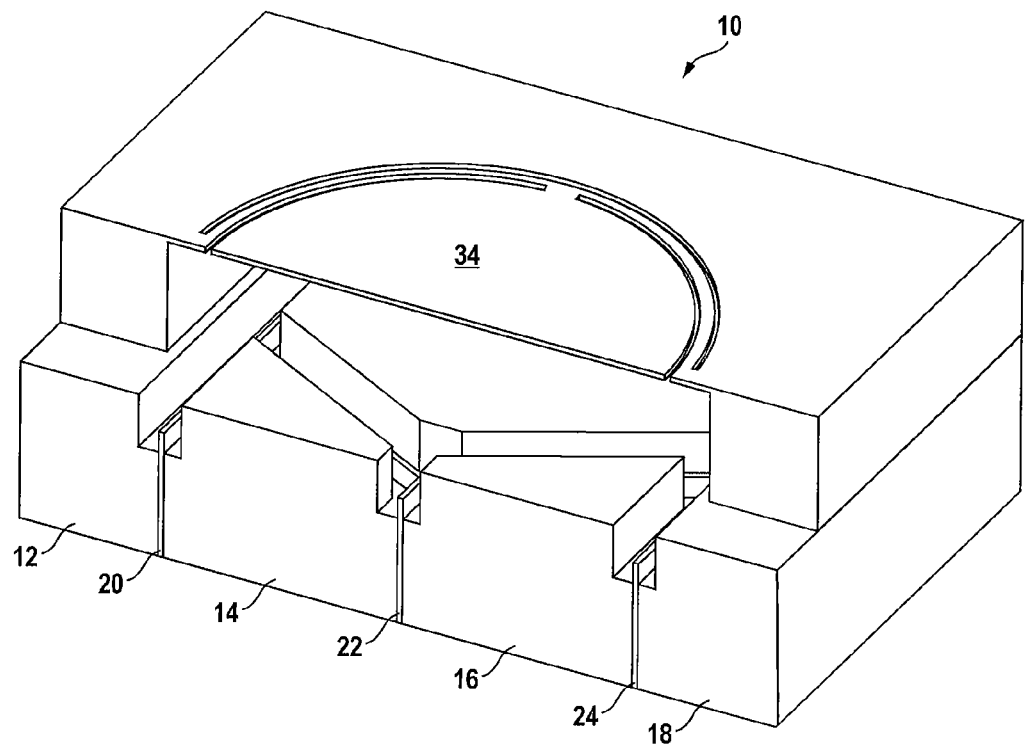
FIG. 4 is a perspective view of the MEMS-based mirror shown in FIG. 2, in accordance with one embodiment of the present invention.

FIG. 3 is an exemplary embodiment of top view of MEMS-based mirror 10 whose cross-sectional view along lines AA' is shown in FIG. 2. As is seen from FIG. 3, electrodes 14 and 16 are shown as being separated from one another, in part, by trenches 36, 38 and 40 each with a width of A. Each of insulating oxide extensions protruding from the bottom surface of their respective trenches 20, 22 and 24 has a width of W. The height of the oxide extensions is seen from cross-sectional view shown in FIG. 2. FIG. 4 is a perspective view of MEMS-based mirror 10.

Figure 5:
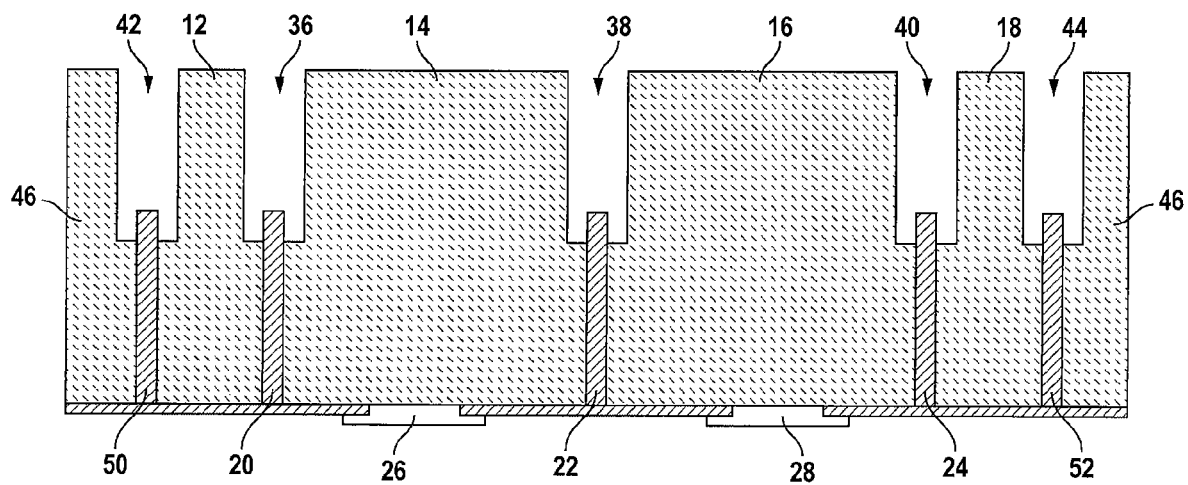
FIG. 5 is a cross-sectional view of a MEMS-based mirror, in accordance with another embodiment of the present invention.

To further increase the range of voltages that may be applied to a MEMS-based mirror of the present invention, a multitude of trenches is disposed between the electrodes receiving these voltages. FIG. 5 is a cross-sectional view of a MEMS-based mirror 20, in accordance with such embodiments. Disposed between electrodes 16 and 18 is trench 40; and disposed between electrode 18 and substrate 46 is trench 44. Similarly, disposed between electrodes 14 and 12 is trench 36; and disposed between electrode 12 and substrate 46 is trench 42. Trench 38 is disposed between electrodes 14 and 16.

Each of the trenches shown in FIG. 5 is characterized by a depth B and a width A. The trench dimensions are selected in accordance with the Paschen curve shown in FIG. 2. For example, in one embodiment, to sustain the application of 800 V between electrode 16 and substrate 46, in one embodiment, trench depth B is selected to be 180 μm, and trench width A is selected to be 80 μm. In one embodiment, the height H and weight W of oxide extensions, are selected to have respective values of, for example, 20 μm and 10 μm.

Figure 6:
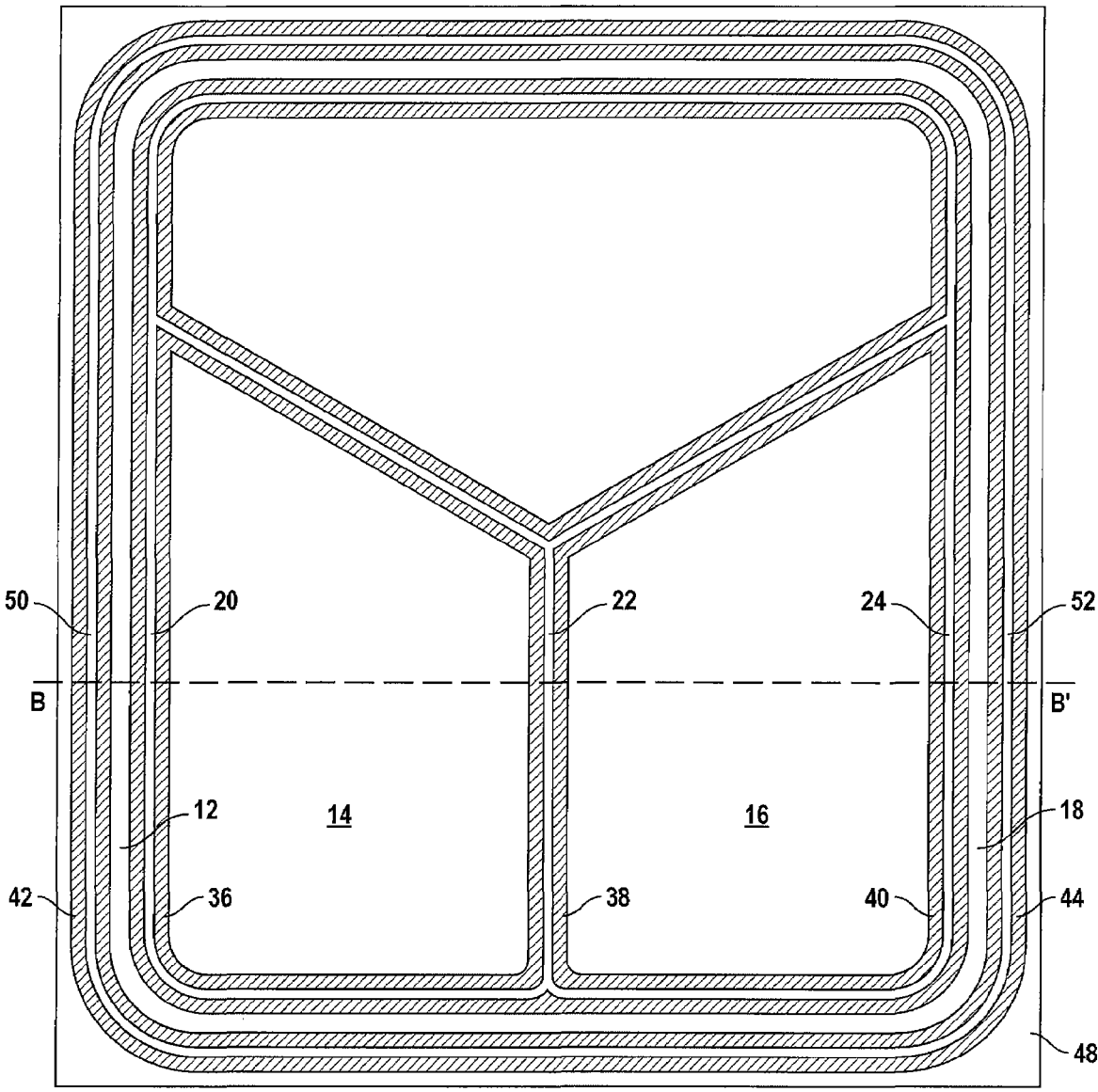
FIG. 6 is a top view of the MEMS-based mirror shown in FIG. 4.

FIG. 6 is an exemplary embodiment of top view of MEMS-based mirror 20 whose cross-sectional view along lines AA' is shown in FIG. 5. As is seen from FIG. 6, for example, substrate 46 and electrode 16 are shown as being separated from one another, in part, by trenches 44, and 40 each having a gap of A. Each of insulating oxide extensions 52, 24, 22, 20 and 50 protruding from the bottom surface of their respective trenches 44, 40, 38, 36 and 42 has a width of W. The height of the oxide extensions is seen from cross-sectional view shown in FIG. 4. It is understood that by providing more trenches with oxide or other insulating materials extending above these trenches, substantially higher voltages may be applied between the electrodes. For example, by providing three trenches each selected to safely support, for example, 400 V, applied voltages of 1200 volts can be sustained.

The above embodiments of the present invention are illustrative and not limiting. Various alternatives and equivalents are possible. The invention is not limited by the height or width of the trenches disposed between the electrodes. Nor is the invention limited by the height or width of insulating extensions, e.g., oxide, nitride or otherwise, protruding from the bottom of the trenches. The invention is not limited by the number of trenches nor is the invention limited by the number of extensions protruding from each trench. The invention is not limited by the material used to form the electrodes. The present invention may also be used in other MEMS devices. Other additions, subtractions or modifications are obvious in view of the present disclosure and are intended to fall within the scope of the appended claims.

What is claimed is:

1. An electrostatically controlled micro-electro mechanical system (MEMS) device comprising:

first and second adjacent electrodes formed in a substrate and not separated from the substrate;

an open trench disposed between the first and second adjacent electrodes to form an air gap between opposing sides of said first and second electrodes thereby providing a Paschen separation between said first and second electrodes; and an insulating layer formed between the first and second electrodes; said insulating layer defining a free-standing wall protruding from a bottom surface of the open trench and having air space on both sides of said free-standing wall between said adjacent electrodes to form a further barrier between said first and second electrodes.

2. The electrostatically controlled MEMS device of claim 1 wherein height of said trench is greater than a width of said trench.

3. The electrostatically controlled MEMS device of claim 1 wherein a height of the insulating layer's free-standing wall protruding from the bottom surface of the trench is greater than a width of the free-standing wall.

4. The electrostatically controlled MEMS device of claim 1 wherein said substrate is a silicon substrate.

5. The electrostatically controlled MEMS device of claim 4 wherein said insulating layer is silicon dioxide.

6. The electrostatically controlled MEMS device of claim 1 further comprising:

a mirror positioned above the electrodes.

7. The electrostatically controlled MEMS device of claim 1 further comprising:

a third electrodes adjacent said second electrode formed in the substrate and not separated from the substrate;

a second open trench etched between the second and third electrodes to separate said second and third electrodes with an air gap; and a second insulating layer formed between the second and third electrodes; said second insulating layer defining a second free standing wall protruding from a bottom surface of the second trench and having air space on both sides of said wall between adjacent electrodes.

8. The electrostatically controlled MEMS device of claim 7 wherein said first and second trenches are characterized by a same dimensions and wherein a height of each said first and second trenches is greater than a width of each of said first and second trenches.

9. The electrostatically controlled MEMS device of claim 8 wherein said first and second insulating free-standing walls are characterized by same dimensions and wherein a height of each said first and second free-standing walls is greater than a width of each of said first and second free-standing walls.

10. An electrostatically controlled micro-electro mechanical system (MEMS) device comprising:

N electrodes formed in a substrate adjacent one another and not separated from the substrate;

M open trenches each disposed between a different pair of said adjacent electrodes to form respective air gaps providing a Paschen separation between said adjacent electrodes;

M insulating layers each associated with a different one of the M trenches and each formed between a different pair of adjacent electrodes; each insulating layer defining a respective free standing wall protruding from a bottom surface of an associated open trench to form a further barrier having air space on both sides of said wall between said adjacent electrodes; and one or more mirrors positioned confronting the electrodes.

11. The electrostatically controlled MEMS device of claim 10 wherein a height of said trench is greater than a width of said trench.

12. The electrostatically controlled MEMS device of claim 10 wherein a height of the insulating layer's free-standing wall protruding from the bottom surface of the trench is greater than a width of the free-standing wall.

* * * * *